Figure 1:
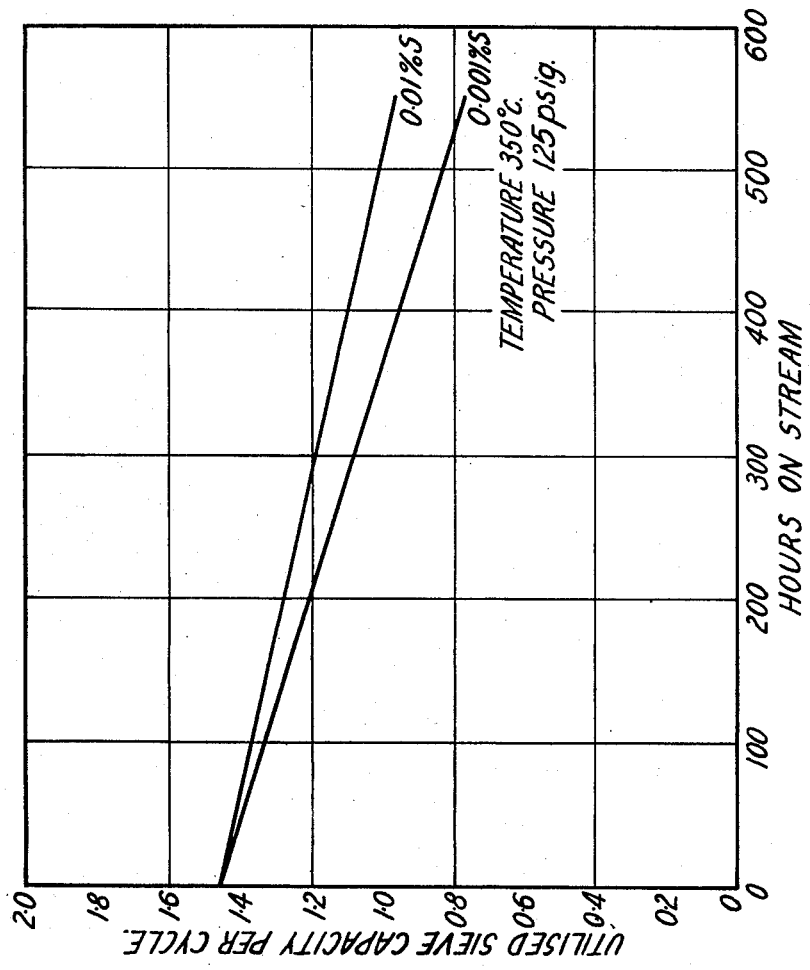

United States Patent Office 3,183,182
Patented May 11, 1965

3,183,182
PROLONGATION OF SIEVE CAPACITY BY CONTROLLED DESULFURIZATION
Alan Arthur Yeo, Clive Leonard Hicks, and Roger Templeton Lewis Mowll, Sunbury-on-Thames, Middlesex, England, assignors to The British Petroleum Company Limited, of Britannic House, London, England, a British joint-stock corporation
Filed Aug. 13, 1962, Ser. No. 216,476
Claims priority, application Great Britain, Sept. 8, 1961, 32,302/61
9 Claims. (Cl. 208—212)

This case relates to separation processes using molecular sieves for the separation of straight-chain hydrocarbons from mixtures of the same with branched-chain and/or cyclic hydrocarbons.

Certain natural and synthetic zeolites are well known to possess the property of preferentially absorbing certain types of hydrocarbons. These zeolites, known as molecular sieves, have crystalline structures containing a large number of pores of uniform size. In different zeolites these pores may vary from about 4 A. to 15 A. in diameter but in any one zeolite the pores will be of substantially uniform size. A zeolite having pore diameter of about 5 A. is suitable for the separation of straight-chain hydrocarbons from mixtures of the same with branched-chain and/or cyclic hydrocarbons.

It is also known that molecular sieves are sensitive to polar compounds, including sulfur compounds, and that these compounds have the effect of deactivating a sieve, i.e., reducing its absorptive capacity. It has, therefore, been accepted that it is desirable to eliminate these polar materials as far as possible from feedstocks to molecular sieve separation processes, for example in the case of sulfur compounds by desulfurization.

It has now been found, however, that there is a positive advantage in desulfurizing a hydrocarbon feedstock to a molecular sieve separation process to an intermediate level only and according to the present invention a process for separating straight-chain hydrocarbons from feedstocks containing the same in admixture with branched-chain and/or cyclic hydrocarbons by extraction with a 5 A. molecular sieve comprises first subjecting the feedstock to a desulfurization step wherein the sulfur content is reduced to a value within the range 0.002–0.015% weight.

The present invention applies particularly to processes in which the sulfur content of the feedstock is reduced by hydrocatalytic desulfurization. The conditions necessary to reduce the sulfur content to the required level by hydrocatalytic desulfurization may readily be determined by experiment and may be selected from the following ranges:

Temperature _____ 300–480° C., preferably 370–430° C.
Pressure _____ 50–2000 p.s.i.g., preferably 500–1500 p.s.i.g.
Space velocity _____ 0.5–20 v./v./hr., preferably 1–10 v./v./hr.
Hydrogen rate (recycle or once-through) _____ 50–10,000 s.c.f./b., preferably 500–4000 s.c.f./b.

The catalyst may be any one or more of the known sulfur-resistant metals or metal compounds having hydrogenating activity selecting from Groups VIa and VIII of the Periodic Table, preferably supported on a refractory oxide, for example alumina. Particularly suitable catalysts are those having cobalt and molybdenum oxides on a refractory oxide support, for example alumina, preferably containing 1–10% weight cobalt oxide expressed as CoO and 4–40% weight molybdenum oxide expressed as $MoO_3$.

The molecular sieve separation may comprise an absorption stage and a desorption stage with an intervening purge stage. Suitable conditions may be selected from the following ranges:

| | Temperature | Pressure | Space Velocity | Period |
|---|---|---|---|---|
| Absorption | 200–600° C., pref. 300–450° C. | 0–500 p.s.i.g., pref. 100–300 p.s.i.g. | 0.1–3.0 v./v./hr., pref. 0.5–2.0 v./v./hr. | 10 sec. to 20 min., pref. 1 to 10 min. |
| Purge | 200–600° C., pref. 300–450° C. | 0–500 p.s.i.g., pref. 100–300 p.s.i.g. | 50–400 GHSV, pref. 100–300 GHSV. | 10 sec. to 20 min., pref. 1 to 10 min. |
| Desorption | 200–600° C., pref. 300–450° C. | 0–500 p.s.i.g., pref. 100–400 p.s.i.g. | 0.1–4.0 v./v./hr., pref. 0.5–2.0 v./v./hr. | 0.5 to 50 min., pref. 5 to 20 min. |

The molecular sieve separation is preferably carried out in the vapour phase and may be isothermal and/or isobaric. The preferred purging agent is nitrogen and the preferred desorbing agent are straight-chain paraffins for example n-butane and n-pentane.

The process is suitable for treating any feedstock containing straight-chain hydrocarbons and branched chain and/or cyclic hydrocarbons together with sulfur in an amount greater than 0.01% weight. The process is particularly suitable for the treatment of petroleum feedstocks containing more than 1% weight sulfur. Examples of suitable feedstocks include petroleum fractions boiling within the range 85 to 400° C. and the process is particularly suitable for treating gas oils, i.e., fractions boiling between 200–400° C.

It has been found that by limiting the extent of desulfurization to between 0.002 and 0.015% a longer sieve life, i.e., a longer period before regeneration becomes necessary, is obtained than would be obtained by hydrocatalytically desulfurizing to a level of 0.001% weight. While the reason for this is not clear it is suggested that the severe conditions necessary to desulfurize to a level below 0.002% weight may produce materials, for example polynuclear aromatics or olefins, which adversely affect the activity of the sieve to an extent which outweighs the advantage conferred by the extra desulfurization.

The invention is illustrated by the following comparative example:

EXAMPLE

Two samples of a straight-run Middle East gas oil boiling between 220 and 345° C. and containing 1.14% weight sulfur were hydrofined under the conditions indicated in Table 1 below, the sulphur contents being reduced to 0.01% weight and 0.001% weight respectively.

Table 1

| Feed to Process | A | B |
|---|---|---|
| Hydrofining Data: | | |
| Catalyst | Co,[1] 2.55% wt. Mo,[1] 14.4% wt. Alumina, balance. | Co,[1] 3.4% wt. Mo,[1] 18.4% wt. Alumina, balance. |
| Temperature, ° C | 400 | 395. |
| Pressure, p.s.i.g | 1000 | 1,000. |
| Feed Rate, v./v./hr | 2.2 | 3.3. |
| H₂ Recycle Rate, s.c.f./b. | 1,000 | 1,000. |
| Product Data: | | |
| Sulfur Content (Total), Percent wt. | 0.01 | 0.001. |

[1] Present as oxides.

The desulfurized samples were then subjected to molecular sieve extraction using a Davison Co. 5 A. type sieve under the conditions indicated in Table 2 below:

Table 2

|  | Temperature, °C. | Pressure, p.s.i.g. | Space Velocity, v./v./hr. | Period, mins. |
|---|---|---|---|---|
| Absorption | 350 | 125 | 0.6 | 6 |
| Purge | 350 | 125 | 12°(GHSV) | 6 |
| Desorption | 350 | 125 | 1.0 | 12 |

The purging agent was nitrogen and the desorbing agent was n-pentane.

The production rate of the process was plotted against elapsed time for each sample and the results are plotted in the accompanying FIG. 1.

In FIG. 1 the "Utilized sieve capacity per cycle" is the weight of n-paraffins produced per cycle per 100 grams of sieve. It is seen that the decay rate of the sieve is less when treating the gas oil of high sulfur content.

Figure 2:
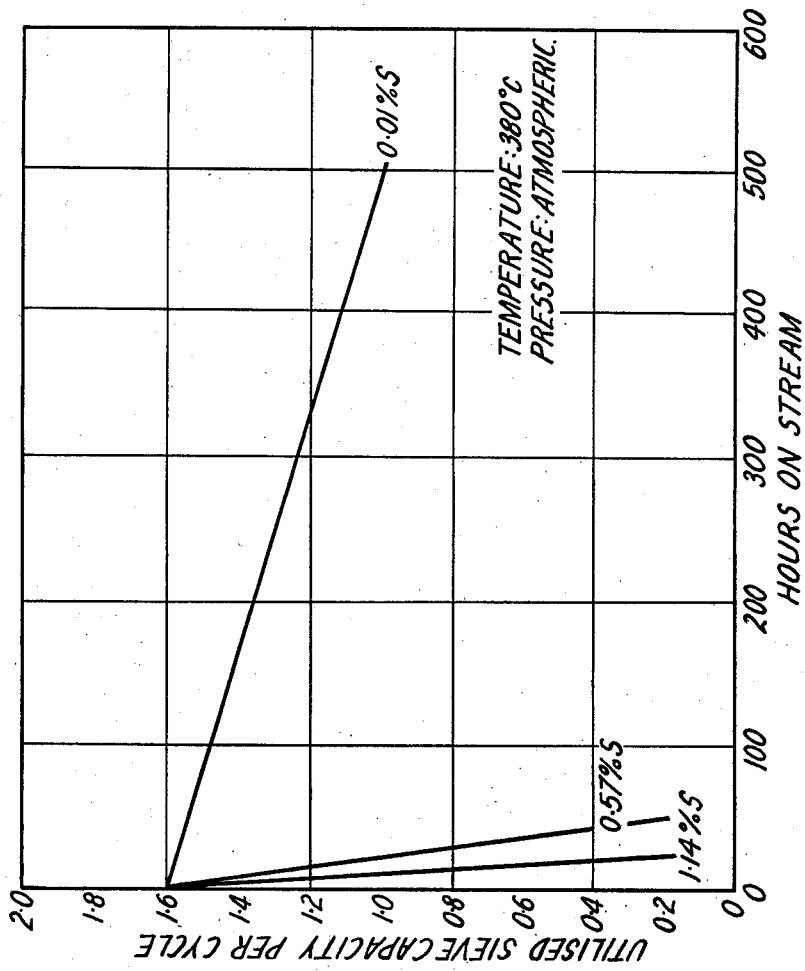

In FIG. 2 the effect of sulfur on sieve life is shown at levels of 1.14%, 0.57% and 0.01% weight. In this case the molecular sieve extraction was isothermal and isobaric at 380° C. and atmospheric pressure. It is seen that at the higher sulfur levels of 1.14% and 0.57% the decay rate is rapid as would be expected in view of the prior art.

We claim:

1. A process for separating straight-chain hydrocarbons from feedstocks of petroleum fractions boiling between 85–400° C. containing the straight-chain hydrocarbons in admixture with branched-chain and/or cyclic hydrocarbons by extraction with a 5 A. molecular sieve wherein the feedstock containing more than 1% weight sulfur hydrocatalytic is first subjected to a desulfurization step in which the sulfur content is reduced to a value within the range 0.002 to 0.015% weight by hydrocatalytic desulfurization in the presence of a catalyst comprising at least one metal selected from Groups VIa and VIII of the Periodic Table supported on a refractory oxide, at a temperature between 300–480° C., a pressure between 50–2000 p.s.i.g., a space velocity between 0.5–20 v./v./hr. and a hydrogen flow rate between 50–10,000 s.c.f./b.

2. A process as claimed in claim 1 wherein the feedstock boils between 200–400° C.

3. A process as claimed in claim 1 wherein the hydrocatalytic desulfurization is carried out at a temperature between 370–430° C., and a pressure between 500–1500 p.s.i.g.

4. A process as claimed in claim 3 wherein the hydrocatalytic desulfurization is carried out at a space velocity between 1–10 v./v./hr., and hydrogen flow rate between 500–4,000 s.c.f./b.

5. A process as claimed in claim 1 wherein the molecular sieve extraction comprises a three-stage operation including an absorption stage, a purge stage and a desorption stage.

6. A process as claimed in claim 5 wherein all three stages of the molecular sieve extraction are operated in the vapour phase.

7. A process as claimed in claim 6 wherein the molecular sieve extraction is operated isothermally and isobarically at a temperature between 200–600° C. and a pressure between 0–500 p.s.i.g.

8. A process as claimed in claim 5 wherein the purging agent employed is nitrogen and the desorbing agent employed is selected from the group consisting of n-butane and n-pentane.

9. A process as claimed in claim 7 wherein the molecular sieve extraction is operated at a temperature between 200–600° C. and a pressure between 0–500 p.s.i.g.

References Cited by the Examiner
UNITED STATES PATENTS

| 2,859,256 | 11/58 | Hess et al. | 260—676 |
| 2,920,037 | 1/60 | Haensel | 260—676 |
| 2,924,630 | 2/60 | Fleck et al. | 260—676 |
| 3,030,431 | 4/62 | Mattox et al. | 260—676 |
| 3,102,853 | 9/63 | Skarstrom et al. | 208—310 XR |

ALPHONSO D. SULLIVAN, Primary Examiner.

UNITED STATES PATENT OFFICE
CERTIFICATE OF CORRECTION

Patent No. 3,183,182                                       May 11, 1965

Alan Arthur Yeo et al.

It is hereby certified that error appears in the above numbered patent requiring correction and that the said Letters Patent should read as corrected below.

Column 3, line 36, strike out "hydrocatalytic" and insert the same after "to a", same line 36, same column 3.

Signed and sealed this 21st day of September 1965.

(SEAL)
Attest:

ERNEST W. SWIDER                                   EDWARD J. BRENNER
Attesting Officer                                      Commissioner of Patents